(12) United States Patent
Yen et al.

(10) Patent No.: US 8,246,765 B2
(45) Date of Patent: Aug. 21, 2012

(54) METHOD FOR INHIBITING GROWTH OF TIN WHISKERS

(75) Inventors: Yee-Wen Yen, Taipei (TW); Meng-Yu Tsou, Taipei (TW); Chien-Chung Jao, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 79 days.

(21) Appl. No.: 12/702,604

(22) Filed: Feb. 9, 2010

(65) Prior Publication Data

US 2011/0094634 A1  Apr. 28, 2011

(30) Foreign Application Priority Data

Oct. 27, 2009  (TW) ............................... 98136295 A

(51) Int. Cl.
 *C22F 1/16* (2006.01)
(52) U.S. Cl. ........................................ 148/518; 148/527
(58) Field of Classification Search .................. None
See application file for complete search history.

(56) References Cited

U.S. PATENT DOCUMENTS

| 5,277,756 | A | * | 1/1994 | Dion | ............................ 438/754 |
| 2003/0129441 | A1 | * | 7/2003 | Hara et al. | ..................... 428/647 |
| 2008/0041611 | A1 | * | 2/2008 | Shukushima et al. | ...... 174/117 F |

OTHER PUBLICATIONS

Kim et al. "The effect of postbake treatment on whisker growth under high temperature and humidity conditions on tin-plated Cu substrates", 2008, online Oct. 2007, Materials Letters 62, pp. 1867-1870.*

David A. Pinsky, "The role of dissolved hydrogen and other trace impurities on propensity of tin deposits to grow whiskers", 2008, online Mar. 2008, Microelectronics Reliability 48, pp. 675-681.*

* cited by examiner

*Primary Examiner* — George Wyszomierski
(74) *Attorney, Agent, or Firm* — Pai Patent & Trademark Law Firm; Chao-Chang David Fai

(57) ABSTRACT

A method for inhibiting growth of tin whiskers is provided. The method includes providing a metal substrate, forming a tin layer to cover the surface of the metal substrate, and treating the metal substrate covered the tin layer by an annealing process, wherein the annealing process is performed at 400° C.-600° C. and the surface of the tin layer is subsequently inhibited from growing tin whiskers.

11 Claims, 9 Drawing Sheets

METHOD FOR INHIBITING GROWTH OF TIN WHISKERS

CROSS REFERENCE TO RELATED APPLICATIONS

This Application claims priority of Taiwan Patent Application No. 98136295, filed on Oct. 27, 2009, the entirety of which is incorporated by reference herein.

BACKGROUND OF THE INVENTION

1. Field of the Invention

The invention relates to a method for inhibiting the growth of tin whiskers, and more particularly to a method for inhibiting growth of tin whiskers in connecting elements of electronic device packages.

2. Description of the Related Art

Currently, copper or an iron-nickel alloy is the major material used for lead frames of chip packages for providing carriers of chips and electrically connecting chips to print circuit boards. Because the bonding strength between these two kinds of lead frame materials and the print circuit boards is poor, a solder layer is coated on the surface of the lead frame to improve the bonding strength between the lead frame and the print circuit board.

Generally, a tin-lead alloy is used for the solder layer on the surface of the lead frame. Because lead is toxic and harmful to the environment, a lead-free solder is currently used to substitute the conventional tin-lead solder. However, at room temperature, tin whiskers spontaneously grow in the lead-free solder. When the tin whiskers grow to a certain length, two adjacent pins of the lead frame are connected by the tin whiskers and a short occurs between the two adjacent pins of the lead frame. Moreover, while the tin whiskers are grown to a length close to a pitch between the two adjacent pins of the lead frame, a point discharge occurs at the pins of the lead frame and a spark is produced by the point discharge to make the packaged electronic devices fail.

The conventional methods for inhibiting growth of tin whiskers includes three types of methods as shown below:

1. Changing the thickness of the solder layer: the solder layer having a thickness less than 0.5 µm or greater than 20 µm is used for inhibiting the growth of tin whiskers. However, a bridge formation easily occurs in thick solder layers which are used in tiny products and the risk of a short therefore increases. Meanwhile, thin solder layers reduce the functionality of the product and increase the likelihood of corrosion and instability etc.

2. Using an alloy coating layer as a barrier layer: a nickel alloy or a silver alloy layer is formed between a solder layer and a copper substrate to serve as a barrier layer to inhibit the growth of tin whiskers. However, under the effects of thermal expansion, the coefficient difference between the materials of the solder layer, the barrier layer and the copper substrate causes compression stress to form in multi-layered metal structure or an inter-metallic compound layer to induce the growth of tin whiskers 3. Performing an annealing treatment: the structure of a solder layer and a copper substrate are treated with an annealing process at a temperature below the melting point of tin, i.e. 231.89° C. to inhibit growth of tin whiskers. However, an inter-metallic compound (IMC) formation is accelerated in the structure treated by the above mentioned annealing process, at a temperature below the melting point of tin, such that the bonding ability of the solder layer is decreased and the soldering ability of pins in the lead frame is also reduced. Meanwhile, the surface color of the solder layer changes during the annealing process, thus the soldering ability of the solder layer is also reduced.

Therefore, a method for inhibiting growth of tin whiskers which can overcome the above problems and effectively inhibiting the growth of tin whiskers is desired

BRIEF SUMMARY OF THE INVENTION

An embodiment of the invention provides a method for inhibiting growth of tin whiskers. In an embodiment of the invention, firstly, a tin layer is formed on a metal substrate and then an annealing process is implemented to the metal substrate and the tin layer. This method can effectively inhibit growth of tin whiskers in the tin layer.

According to an embodiment of the invention, the method for inhibiting growth of tin whiskers comprises providing a metal substrate; forming a tin layer to cover a surface of the metal substrate; and performing an annealing process to the metal substrate and the tin layer, wherein the annealing process is performed at a temperature between 400° C. and 600° C., and the tin layer is formed without tin whiskers.

A detailed description is given in the following embodiments with reference to the accompanying drawings.

BRIEF DESCRIPTION OF THE DRAWINGS

The invention can be more fully understood by reading the subsequent detailed description and Examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

In an embodiment of the invention, a method for inhibiting growth of tin whiskers is provided. First, a metal substrate is provided and a tin layer is formed on the surfaces of the metal substrate. Then, a structure of the metal substrate covered with the tin layer is treated by an annealing process. The annealing process is implemented at a temperature between 400° C. and 600° C., to thereby inhibit the growth of tin whiskers.

Figure 1:
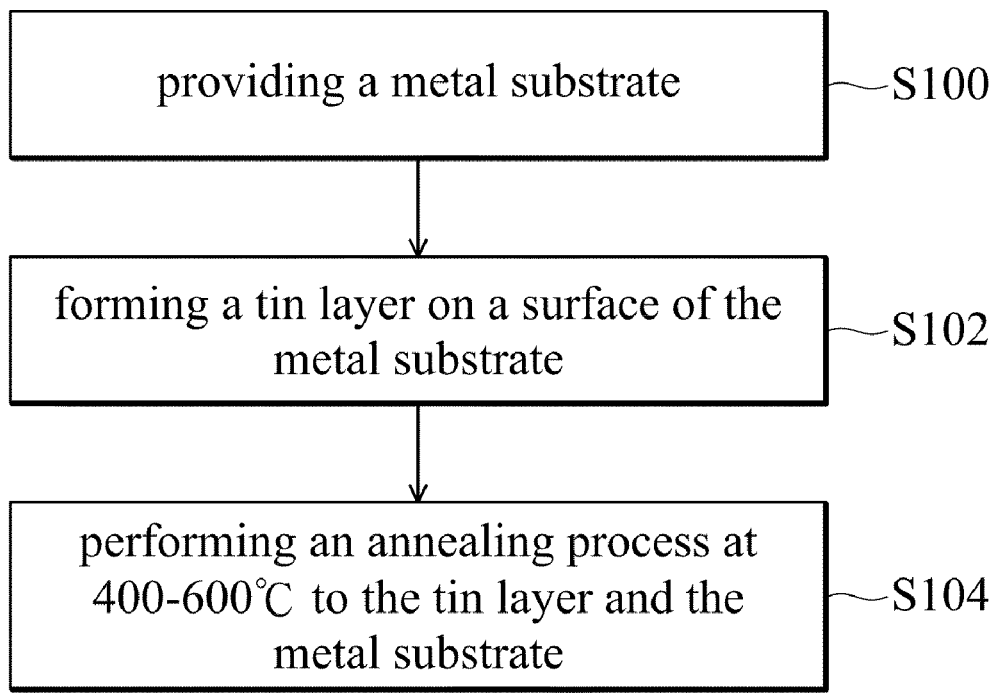
FIG. 1 shows a flowchart of a method for inhibiting growth of tin whiskers according to an embodiment of the invention.

Referring to FIG. 1, a flow chart of a method for inhibiting growth of tin whiskers according to an embodiment of the invention is shown. First, in step S100, a metal substrate is provided. In an embodiment, the metal substrate may be copper or an iron-nickel alloy.

Next, in the step S102, a tin layer is formed to cover the surfaces of the metal substrate. In an embodiment, the tin layer may be a lead-free complete tin layer formed by an electroplating process to cover all surfaces of the metal substrate. The tin layer may be a matte tin or a bright tin. In addition, the thickness of the tin layer may be between about 3 μm and about 20 μm.

Then, in the step S104, the structure of the metal substrate covered with the tin layer is treated by an annealing process. In an embodiment, the annealing process is performed at a temperature between about 400° C. and about 600° C. In an embodiment, the time for the annealing process may be from about 2 minutes to about 60 minutes, wherein the time for the annealing process from about 2 minutes to 30 minutes is preferred.

Then, the structure of the metal substrate covered with the tin layer is tested in an environment suitable for tin whisker growth to determine whether tin whiskers will grow. For example, the structure is set at a temperature of 60° C. for 500 hours to implement an accelerated test. As shown in the result of the test, the methods for inhibiting growth of tin whiskers according to embodiments of the invention are effective.

The growth of tin whiskers results from an irreversible action of increasing and decreasing stress, which produces tiny mono-crystals, i.e. tin whiskers, spontaneously growing on the surface of the tin layer. The tin whiskers protrude from the surface of the tin layer. A major driving force for the growth of tin whiskers is compressive stress, which may originate from an internal stress in the tin layer and an external stress outside the tin layer. The internal stress is mainly produced from the occurrence of impure atoms during the electroplating process, a mismatch of thermal expansion coefficients between the tin layer and the metal substrate, a volume change of the tin layer caused by oxides formed thereon, and an inter-metallic compound (IMC) formed by inter-diffusing between the tin layer and the metal substrate. The external stress may be produced from a compression between the tin layer and the other layers during disposing of the structure containing the tin layer or by an external pressure applied to the surface of the tin layer. Additionally, tin layer scratches, storage environment conditions of electroplate elements, the thickness of the tin layer, a crystal status of the tin layer and electroplating conditions, etc. may also affect the growth of tin whiskers.

In an embodiment of the invention, firstly, the tin layer is coated onto the surfaces of the metal substrate, and then the structure containing the tin layer and the metal substrate is treated by an annealing process at a temperature between 400-600° C., such that the tin layer on the metal substrate is completely melted and rearranged. As the result, it can prevent the tin layer on the metal substrate from producing the internal stress and help to effectively inhibit the growth of tin whiskers.

The metal substrate covered by the tin layer can be used as a connecting element of electronic device packages, such that an electronic device, for example a chip, is electrically connected to an external circuit, for example a print circuit board. The connecting element can be applied to a surface mount technology (SMT) or a pin through hole (PTH) bonding technology for pins of a lead frame or a ball grid array (BGA) structure of a flip-chip bonding.

Figure 2:
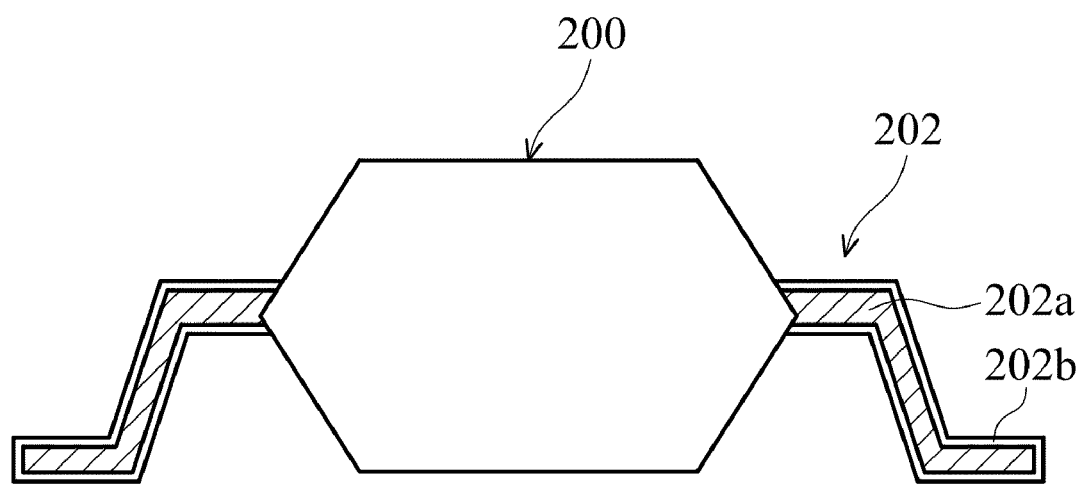
FIG. 2 shows a schematic cross section of pins of a lead frame for an electronic device package according to an embodiment of the invention.

Referring to FIG. 2, a cross section of pins of a lead frame for an electronic device package according to an embodiment of the invention is shown, wherein the pins of the lead frame are made of a metal substrate covered with a tin layer. As shown in FIG. 2, the electronic device package 200 has an electronic device (not shown), for example a chip, embedded therein. The pins 202 of the lead frame are used for electrically connecting the chip to a print circuit board, wherein a body 202a of the pin 202 may be made from copper and the body 202a of the pin is covered with a tin layer 202b. Next, the pins 202 covered with the tin layer 202b thereon is treated by an annealing process at a temperature between 400-600° C. to prevent the tin layer 202b from growing of tin whiskers.

Figure 3:
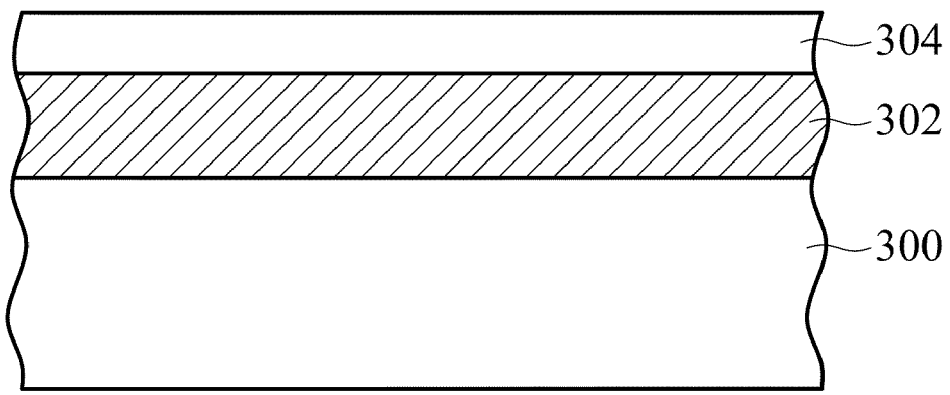
FIG. 3 shows a schematic cross section of a portion of a ball grid array structure for a flip-chip bonding according to an embodiment of the invention.
Figure 4:
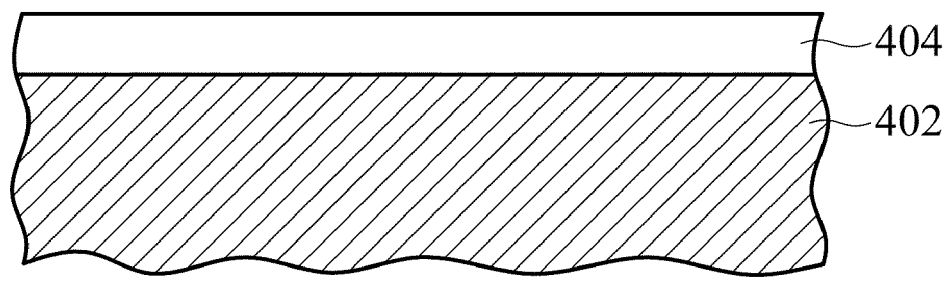
FIG. 4 shows a schematic cross section of a portion of a structure according to each Example and each Comparative Example of the invention.

Referring to FIG. 3, a cross section of a portion of a ball grid array structure for a flip-chip bonding, according to an embodiment of the invention is shown, wherein the ball grid array structure is made of a metal substrate covered with a tin layer and used for an electronic device package. As shown in FIG. 3, firstly, a metal layer 302, using a copper layer for example, is formed on a silicon substrate 300 for a conductive pad. The silicon substrate 300 may be a substrate containing a chip formed thereon. Next, a tin layer 304 is coated on the surface of the metal layer 302. Then, the structure of FIG. 3 is treated by an annealing process at a temperature between 400-600° C. to prevent the tin layer 304 from growing tin whiskers The methods for inhibiting growth of tin whiskers and the results thereof are described in detail by several Examples and Comparative Examples as below:

A cross section of a portion of the structure of each Example and Comparative Example was shown in FIG. 4. A copper plate was used as a substrate 402 and a matte tin layer 404 was coated on the surface of the substrate 402 using an electroplating process. The structure of each Example was treated by an annealing process at a temperature between 400-600° C. and the structure of each Comparative Example was not treated by an annealing process. Then, the structure of each Example and Comparative Example was put in an environment of 60° C. to implement an accelerated test for 500 hours to determine whether tin whiskers were grown on the tin layer 404.

Examples 1-2

The copper plates were polished and burnished to make the surfaces thereof smooth and to remove oxides and impurities thereon. Then, an electroplating process was implemented to the copper plates for coating a matte tin layer thereon. The current densities of the electroplating conditions for the Examples 1-2 were 5 Amp/dm$^2$ (ASD) and 10 Amp/dm$^2$, respectively. As the result, the thicknesses of the matte tin layers of the Examples 1-2 were 5 μm and 6 μm, respectively. Next, the structures of the Examples 1-2 made of the matte tin layer and the copper plate were disposed in a high temperature furnace of 550° C. to implement an annealing process for 2 minutes. Then, the matte tin layer/copper plate structures of the Examples 1-2 treated with the annealing process were disposed in a room temperature environment for cooling. The matte tin layers of the Examples 1-2 were then measured by a scanning electron microscope (SEM). As shown in the results of SEM, the surfaces of the matte tin layers of the Examples 1-2 treated with the annealing process were flat. There were no tin mono-crystals protruding from the surfaces of the matte tin layers.

Next, the matte tin layer/copper plate structures of the Examples 1-2 were disposed in an oven at 60° C. for 500 hours to implement an accelerated test. After the accelerated test, the matte tin layers were measured by a scanning electron microscope (SEM). As shown in the results of SEM, there were no tin whiskers grown on the surfaces of the matte tin layers of the Examples 1-2.

Figure 5:
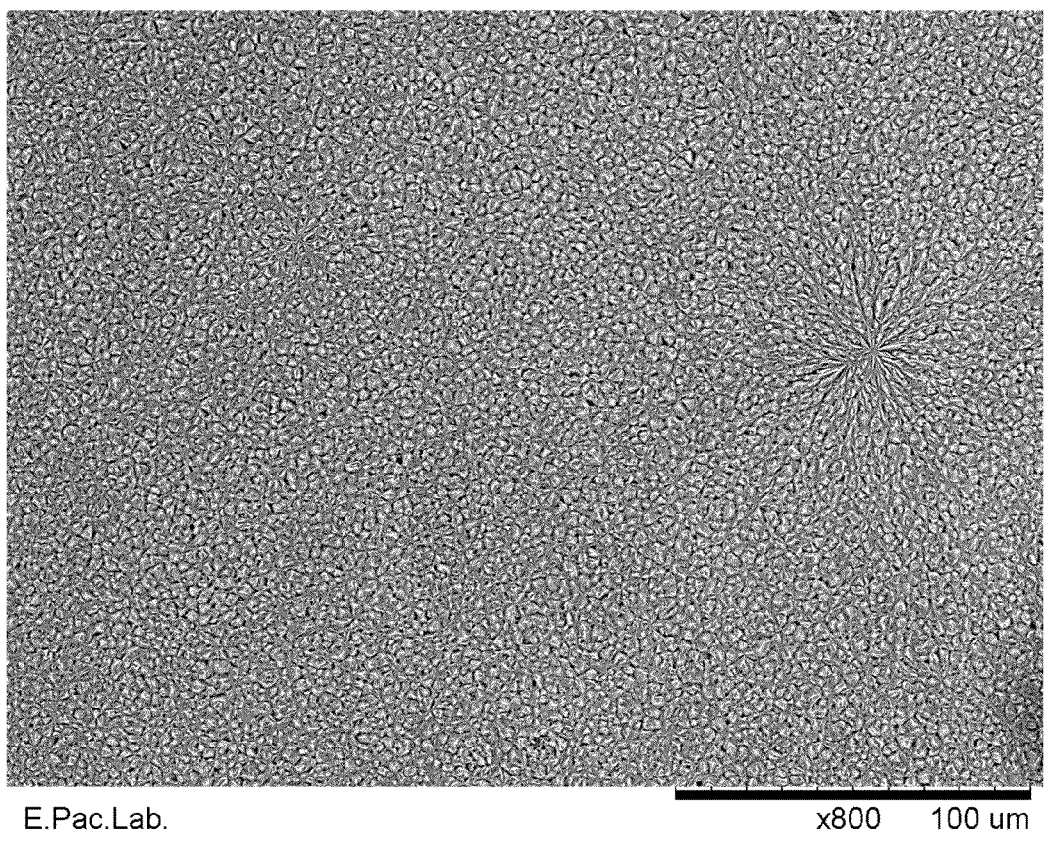
FIG. 5 shows a photograph of a matte tin layer taken by a scanning electron microscope (SEM) according to the Example 1 of the invention.
Figure 6:
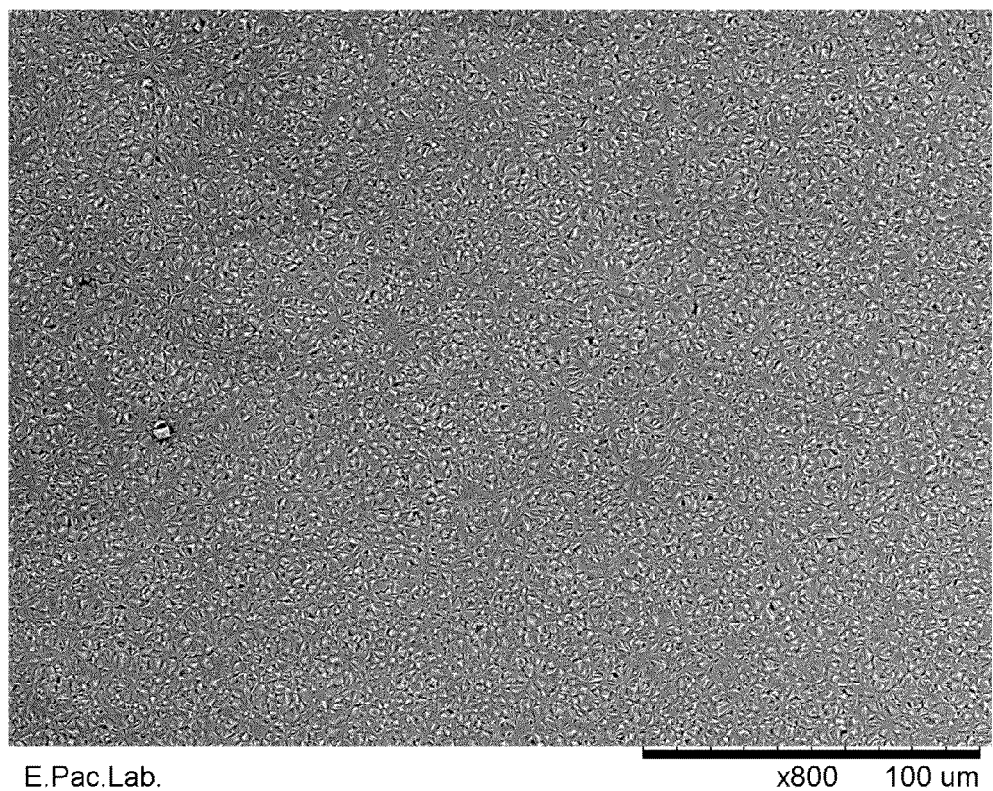
FIG. 6 shows a photograph of a matte tin layer taken by a scanning electron microscope (SEM) according to the Example 2 of the invention.

The photographs of the matte tin layers of the Examples 1-2 taken by a scanning electron microscope (SEM) were shown in FIGS. 5 and 6, respectively.

Comparative Examples 1-2

The copper plates were polished and burnished to make the surfaces thereof smooth and to remove oxides and impurities thereon. Then, an electroplating process was implemented to the copper plates for coating a matte tin layer thereon. The current densities of the electroplating conditions for the Comparative Examples 1-2 were 5 Amp/dm$^2$ (ASD) and 10 Amp/dm$^2$, respectively. As the result, the thicknesses of the matte tin layers of the Comparative Examples 1-2 were 5 µm and 6 µm, respectively. The matte tin layers of the Comparative Examples 1-2 were then measured by a scanning electron microscope (SEM). As shown in the results of SEM, the surfaces of the matte tin layers of the Comparative Examples 1-2 without the annealing process treatment had protruding tin mono-crystals grown thereon.

Next, the matte tin layer/copper plate structures of the Comparative Examples 1-2 were disposed in an oven of 60° C. to implement an accelerated test for 500 hours. After the accelerated test, the matte tin layers were measured by a scanning electron microscope (SEM). As shown in the results of SEM, there were tin whiskers on the surfaces of the matte tin layers of the Comparative Examples 1-2. In addition, the matte tin layer formed by the low current density of the electroplating conditions, i.e. 5 ASD, had a substantial amount of tin whiskers thereon.

Figure 7A:
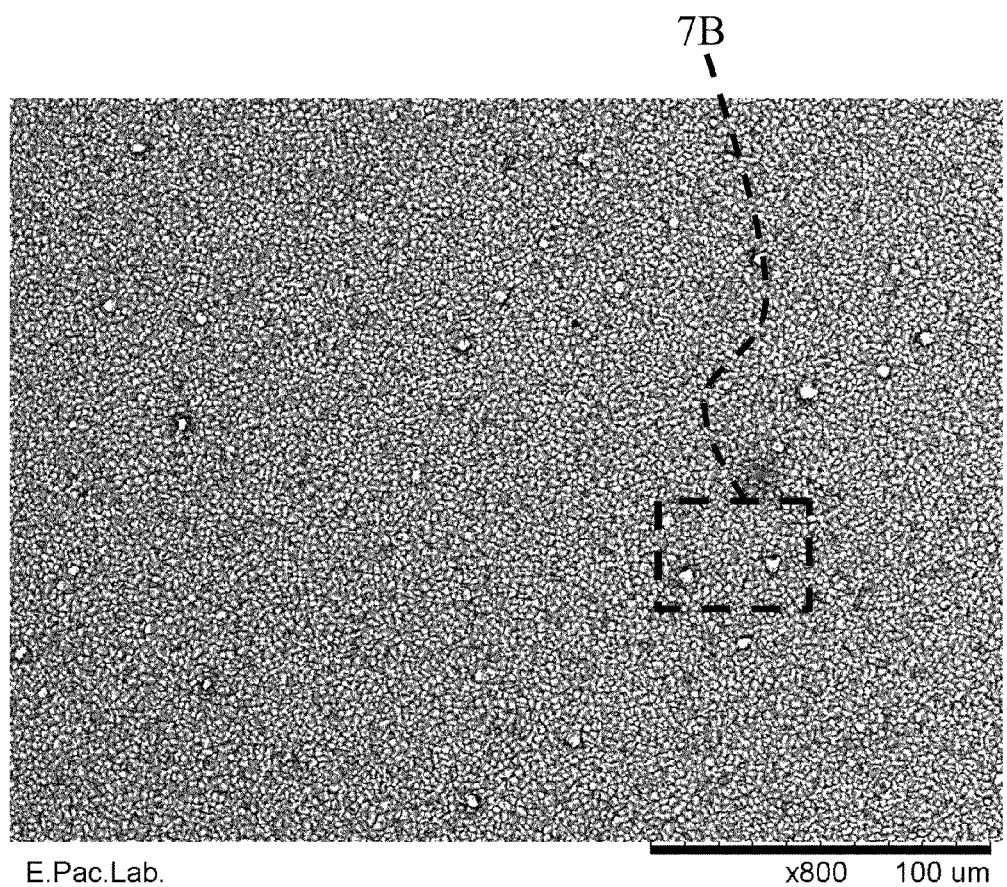
FIG. 7A shows a photograph of a matte tin layer taken by a scanning electron microscope (SEM) according to the Comparative Example 1 of the invention.
Figure 7B:
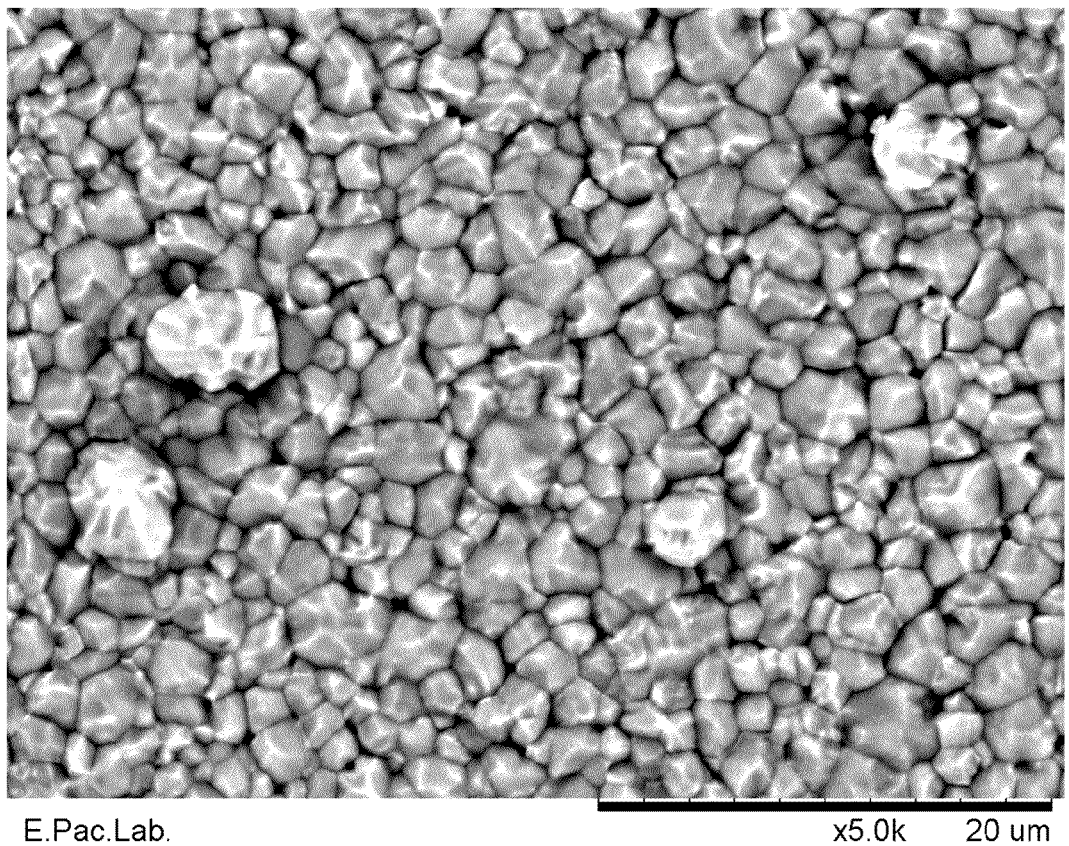
FIG. 7B shows a magnified photograph of the marked area 7B in FIG. 7A.
Figure 8A:
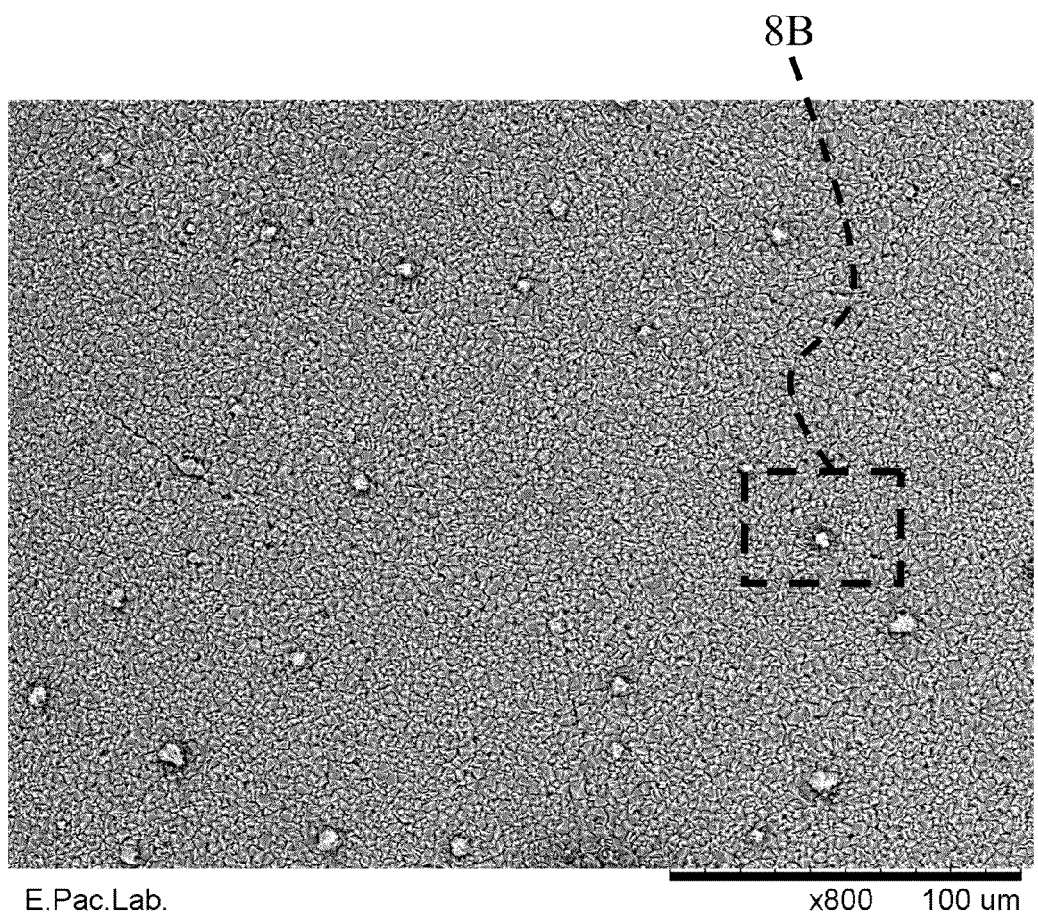
FIG. 8A shows a photograph of a matte tin layer taken by a scanning electron microscope (SEM) according to the Comparative Example 2 of the invention.
Figure 8B:
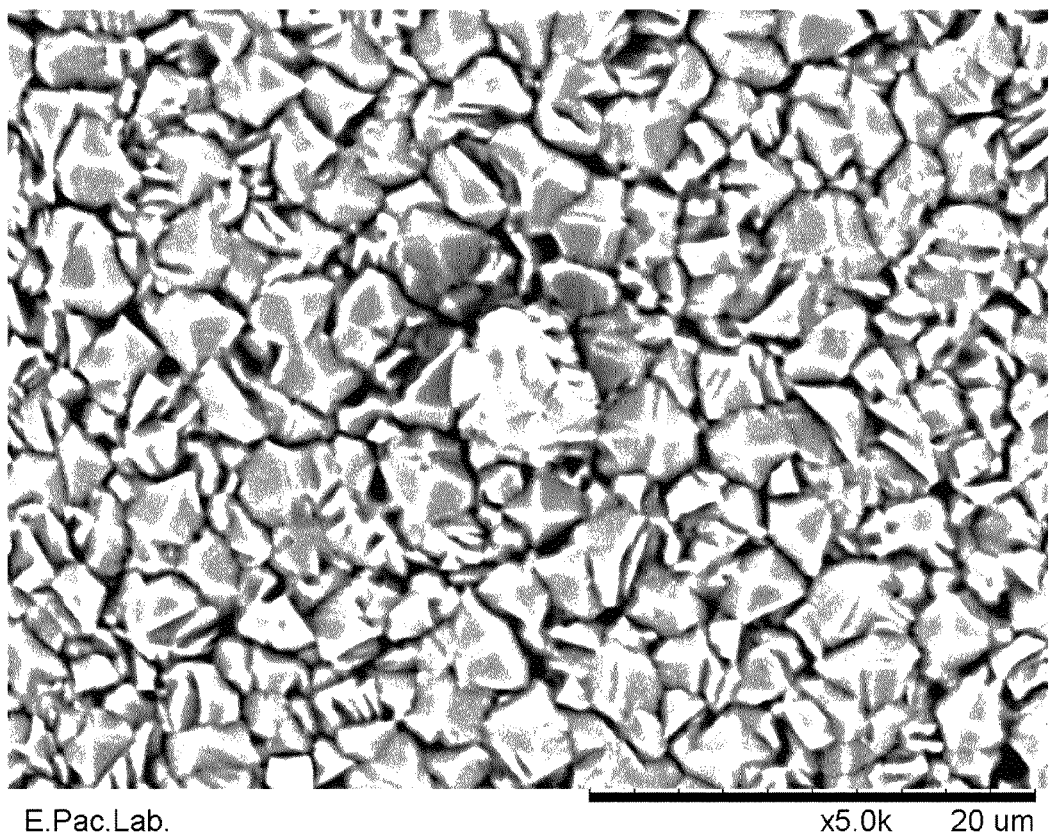
FIG. 8B shows a magnified photograph of the marked area 8B in FIG. 8A.

The photographs of the matte tin layers of the Comparative Examples 1-2 taken by a scanning electron microscope (SEM) were shown in FIGS. 7A and 8A, respectively. The magnified photographs of the marked area 7B in FIG. 7A and the marked area 8B in FIG. 8A were shown in FIGS. 7B and 8B, respectively.

As shown in the results of the photographs of the matte tin layers of each Example and each Comparative Example taken by a scanning electron microscope (SEM), the matte tin layer/copper plate structures treated by the annealing process of a temperature between 400-600° C. are advantageous for effectively inhibiting growth of tin whiskers in the matte tin layers.

The method for inhibiting growth of tin whiskers according to the invention can be applied to any structure needed to form a tin layer on a metal substrate and needed to inhibit growth of tin whiskers in the tin layer. For example, the structure may be a copper layer coated with a tin layer thereon and disposed on a print circuit board, or a copper pad coated with a tin layer thereon and disposed on a silicon substrate, or a copper pin coated with a tin layer thereon and used for a lead frame of a chip package, wherein the tin layer and the metal substrate are simultaneously treated by an annealing process for inhibiting growth of tin whiskers in the tin layer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for inhibiting growth of tin whiskers, comprising:
   providing a metal substrate;
   forming a tin layer, covering a surface of the metal substrate; and
   performing an annealing process to the metal substrate and the tin layer, wherein the annealing process is performed at a temperature between 400° C. and 600° C. for a time between 2 minutes and 60 minutes, such that the tin layer has no tin whisker grown therein.

2. The method as claimed in claim 1, wherein the metal substrate comprises copper or an iron-nickel alloy.

3. The method as claimed in claim 1, wherein the annealing process is performed for a time between 2 minutes and 30 minutes.

4. The method as claimed in claim 1, wherein the step of forming the tin layer comprises an electroplating process.

5. The method as claimed in claim 1, wherein the tin layer is a lead free tin layer.

6. The method as claimed in claim 1, wherein the metal substrate covered with the tin layer thereon is used for a connecting element between an electronic device package and an external circuit.

7. The method as claimed in claim 6, wherein the electronic device package comprises a chip package and the external circuit comprises a print circuit board.

8. The method as claimed in claim 6, wherein the connecting element comprises a pin of a lead frame or a ball grid array for a flip-chip bonding.

9. The method as claimed in claim 1, before the step of performing the annealing process, further comprising disposing the metal substrate on a silicon substrate prior to performing the step of forming the tin layer on the metal substrate.

10. The method as claimed in claim 9, wherein the annealing process is performed to the silicon substrate, the metal substrate and the tin layer simultaneously.

11. A method for inhibiting growth of tin whiskers, comprising:
    providing a metal substrate;
    forming a tin layer, covering a surface of the metal substrate, wherein the tin layer has a thickness between 3 µm and 20 µm; and
    performing an annealing process to the metal substrate and the tin layer, wherein the annealing process is performed at a temperature between 400° C. and 600° C., such that the tin layer has no tin whisker grown therein.

* * * * *